United States Patent [19]
Fukuda et al.

[11] Patent Number: 5,764,926
[45] Date of Patent: Jun. 9, 1998

[54] SUPRESSING IN RUSH CURRENT FROM A POWER SUPPLY DURING LIVE WIRE INSERTION AND REMOVAL OF A CIRCUIT BOARD

[75] Inventors: Kimio Fukuda, Ebina; Kazuo Morita, Hadano, both of Japan

[73] Assignee: Hitachi, Ltd., Tokyo, Japan

[21] Appl. No.: 423,214

[22] Filed: Apr. 17, 1995

[30] Foreign Application Priority Data

Apr. 21, 1994 [JP] Japan .................................. 6-082870

[51] Int. Cl.⁶ ...................................................... H02H 9/00
[52] U.S. Cl. ........................... 395/283; 361/58; 323/908
[58] Field of Search .............................. 395/283, 281, 395/750; 365/226, 228, 229; 327/545, 549, 566, 380, 381; 361/58; 323/908

[56] References Cited

U.S. PATENT DOCUMENTS

| | | | |
|---|---|---|---|
| 4,725,741 | 2/1988 | Shekhaiwat et al. | 327/575 |
| 4,734,595 | 3/1988 | Le Roux et al. | 327/575 |
| 4,977,341 | 12/1990 | Stein | 327/380 |
| 5,132,564 | 7/1992 | Fletcher et al. | 307/443 |
| 5,317,697 | 5/1994 | Husak et al. | 395/283 |
| 5,323,291 | 6/1994 | Boyle et al. | 361/683 |
| 5,369,593 | 11/1994 | Papamarcos et al. | 364/488 |
| 5,430,404 | 7/1995 | Campbell et al. | 327/566 |

FOREIGN PATENT DOCUMENTS

| | | |
|---|---|---|
| 558770 | 9/1993 | European Pat. Off. ......... G06F 13/40 |
| 3-171214 | 7/1991 | Japan . |
| 5-289788 | 11/1993 | Japan . |
| 2248352 | 4/1992 | United Kingdom . |

Primary Examiner—Ayaz R. Sheikh
Assistant Examiner—Sumati Lefkowitz
Attorney, Agent, or Firm—Fay, Sharpe, Beall, Fagan, Minnich & McKee

[57] ABSTRACT

A circuit unit to be inserted or removed by live wire work into or from a system having a plurality of circuit units and a power source to supply power to the plurality of circuit units includes a first circuit to supply power to the circuit unit from the power source when the circuit unit is inserted into the system; and a second circuit to supply power to the circuit unit in normal operation after the circuit unit is inserted into the system. The first circuit nearly stops supplying power about the time when the second circuit starts supplying power and by this arrangement, it becomes possible to vary the timing of inrush currents attending on a supply of power from a plurality of power sources. A removal permission indicator can be installed which can be turned on by a voltage supplied from the power source under a condition that permission to remove the unit has been issued. In order to adjust the unit inserting speed, a lever is mounted rotatably at one end of each circuit unit, for multiplying a force for removing said unit by using as a point of force application a certain point in said system under the condition that permission to remove the circuit unit has been issued. A connector of the circuit unit is structured so as to be freely movable at a mounting portion for several millimeters on the surface of a metal sheet when the system and the connector of the unit are connected mechanically and electrically.

35 Claims, 7 Drawing Sheets

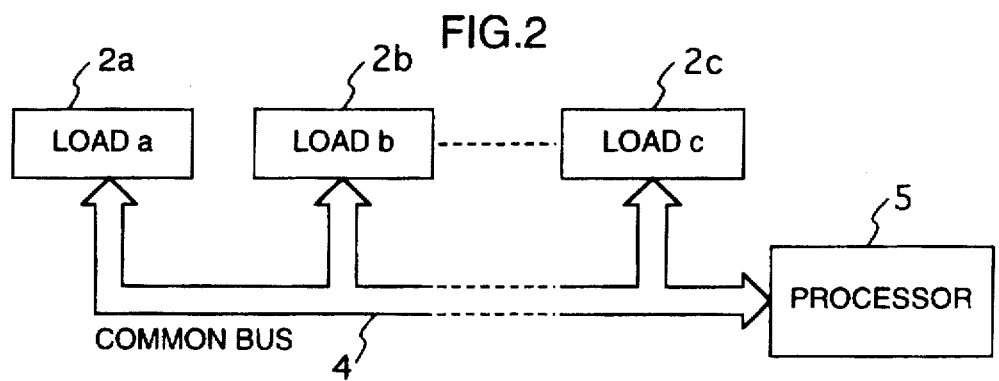
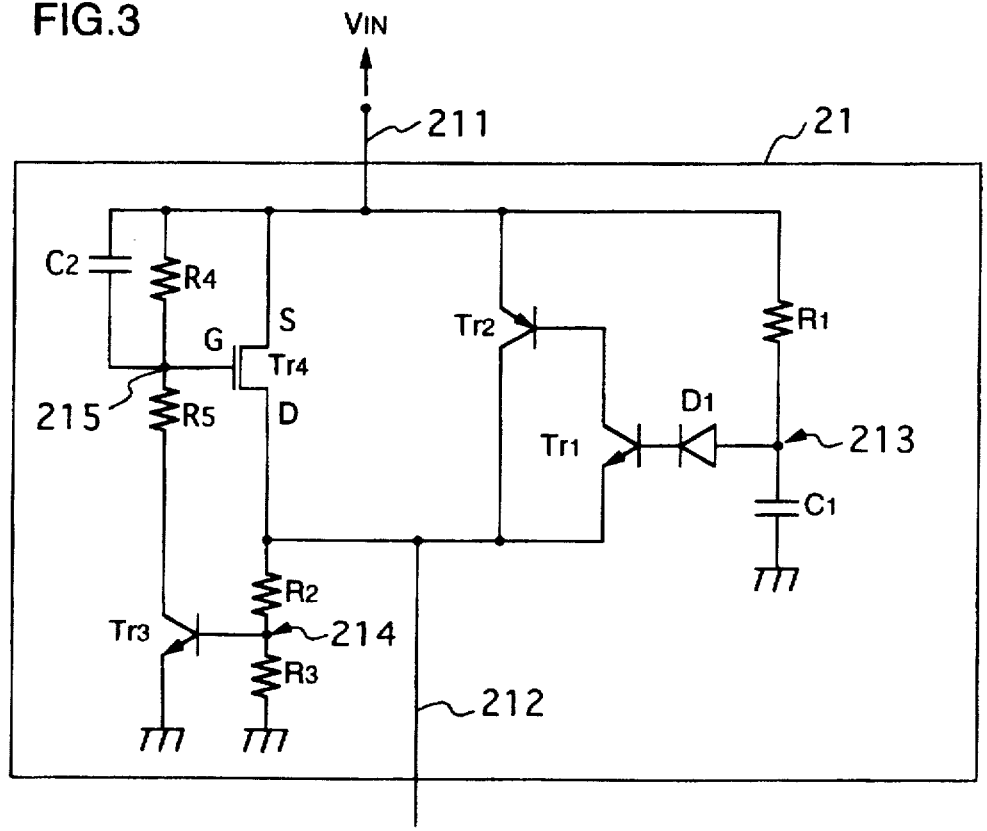
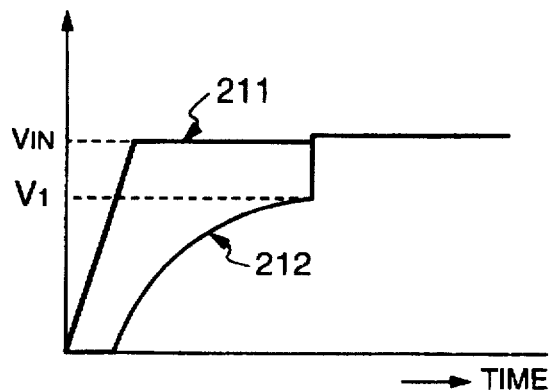

SUPRESSING IN RUSH CURRENT FROM A POWER SUPPLY DURING LIVE WIRE INSERTION AND REMOVAL OF A CIRCUIT BOARD

BACKGROUND OF THE INVENTION

This invention relates to a circuit board for live wire insertion to be used when some load is replaced or added during the operation of a system which has a plurality of loads concurrently in operation.

U.K. Patent Application 2248352A, JP-A-3-171214, and JP-A-5-289788 disclose a live wire insertion system.

Heretofore, when any of the printed circuit packages or other component devices of a system is replaced as it becomes faulty or for maintenance, or when some are added for system expansion, it has been necessary to terminate the system operation and stop the power supply. Recently, there has been a growing requirement for non-stop operation or long-time continuous operation in order to improve the availability of the system, and thus it has become necessary to insert or remove the printed circuit packages or other devices of the system by live wire work. However, if a load is inserted or removed by live wire work, there is a possibility that malfunctioning may occurs. In other words, if there are a plurality of loads, such as printed circuit packages and they are supplied with power from the same power source, when a package is inserted, an inrush current flows from a bypass capacitor between the power source for the package and ground. As a result, the supply voltage to other packages drops and a malfunctioning occurs. In the printed wiring board and its connector for live wire insertion disclosed in JP-A-3-171214, a power terminal for inrush current and a main power terminal are provided in the connector, and the power terminal for inrush current is made longer than the main power terminal. Accordingly, when the wiring board is inserted, the power terminal for inrush current is first connected, and then while a choke coil limits the inrush current, the main power terminal is connected. By this method, drops of supply voltages to the other loads are prevented.

In the above-mentioned prior art, at least two terminals are required for each supply voltage source. This prior-art method is not suitable for such cases where a plurality of power sources are used, the number of power terminals is limited, and a circuit package or the like needs to be mounted with the smallest number of terminals.

If a system comprises a power source E and a plurality of loads 2a to 2d to be inserted or removed by live wire work as shown in FIG. 10. Provided between the power source E and the loads 2a to 2d are resistances r1 to r6 and inductances L1 to L6, though their values are actually small, in the wirings both on the power supply side and on the ground side. Supposing that a load 2b, for example, is inserted, an excessive inrush current flows into the load 2b, and a current flows into the load 2b from the power source E or the loads 2b, 2c and 2d. Also, voltage drops occur across the resistances r1 to r3 and the inductances L1 to L3, and the electric potentials of the loads decrease. Since a current flows from the ground side to the power source E, the ground levels of the loads 2b to 2d will be raised by the resistances r5 and r6 and the inductances L5 and L6. If there are a plurality of power sources for the loads 2b to 2d, a plurality of inrush currents corresponding to the number of power sources also flow to the ground side, causing the ground levels to rise sharply. Consequently, the voltage levels across the loads 2b, 2c and 2d other than the load 2b change, thereby raising a possibility of a malfunctioning.

In a system comprising a plurality of loads, an error may occur that a wrong load is inserted or removed.

Furthermore, in a case where the loads are magnetic disks and the neighboring disks of the inserted or removed disk are affected by a great impact or shock caused by insertion or removal of the disk, there is a possibility of the other magnetic disks may malfunction due to the propagation of the shock.

SUMMARY OF THE INVENTION

An object of the present invention is to provide a method of inserting or removing a load by live wire work while precluding the above-mentioned problems and without resulting in malfunctioning of the system.

Another object of the present invention is to provide a circuit board for live wire insertion, which suppresses or controls the inrush current of the power terminal of a load to be inserted or removed by live wire work and without causing malfunctioning of other loads.

A further object of the present invention is to provide a stable circuit board for live wire insertion, which is equipped with an indicator of permission to remove a load by live wire work, which has eliminated errors in removal, and which enables efficient removal.

Yet another object of the present invention is to provide a unit to be inserted into or removed from a system in operation by suppressing the shock caused by insertion or removal by freely controlling the insertion or removal speed of the load to be inserted or removed by live wire work and to thereby prevent the shock from affecting the other loads.

A still further object of the present invention is to provide a circuit board for live wire insertion in a connector mounting structure which can suppress a great shock, such as swaying by a slip at the time of setting in the connector of a load to be inserted into or removed from a system by live wire work.

In a system having a plurality of loads and a power source to supply power to the plurality of loads, a structure is adopted which is designed such that a current feeding path has the power supplied from the power source through one power terminal of a load to be inserted into or removed from a system by live wire work. The current feeding path is provided with an inrush current circuit to conduct a controlled inrush current from the power source only when power is supplied on insertion of a load. The current feeding path is controlled to not be put into operation the moment the load is inserted and the inrush current circuit conducts a controlled inrush current little by little, and after the flow of this current is finished, the current feeding path is used. Therefore, time can be varied for inrush currents to flow from a plurality of power sources to the loads which require a plurality of supply voltages.

Furthermore, a load to be inserted into or removed from a system is provided with means for indicating permission to insert. When the driver gate of the load to be inserted or removed by live wire work has been in a disabled state, it is possible to indicate permission to insert.

It is possible to furnish a structure for live wire insertion having a slide mechanism based on leverage in order to suppress the load moving speed in insertion or removal and the shock at the moment of insertion and removal and also to restrain the effect of shock on the other loads in operation.

Furthermore, it is possible to furnish a floating connector attachment having one or a combination of vertical, transverse and fore-and-aft moving mechanisms to suppress the excessive shock resulting when a load is inserted and set and to restrain the effect of shock on the other loads in operation.

When a load is inserted, an inrush current from the power supply is limited and is allowed to flow little by little, and after the inrush current has flowed, the primary current feeding path is used. By this arrangement, an excessive current is prevented from flowing. Therefore, the above-mentioned structure for live wire insertion prevents drops of supply voltages to the other loads, has no effects on the other loads, and is suitable for use as a conventional mother board wiring structure having one power terminal for one power source.

Though there are a plurality of power sources, the time for respective inrush currents to flow is varied. It is possible to avoid great changes of ground levels of the other loads by concentrated flow of a plurality of inrush currents, and preclude malfunctioning of the other loads.

Since an indicator is provided to show permission to remove a load by live wire work, mistakes can be avoided that a wrong load is removed. Since permission to remove a load is indicated when the driver gate for the load to be removed is in a disabled (high impedance) state, removal of the load does not have any effect caused by removal noise on other loads.

Further, the moving speed of the load to be inserted or removed by live wire work can be controlled, so that insertion or removal can be done slowly, and a shock caused by insertion or removal can be reduced so as not to affect the other loads.

Further, shocks are most likely to occur when the connector of the load to be inserted or removed is set into a system. However, if the connector is designed as a floating connector attachment, it has a better fitting property, so that shocks can be suppressed so as not to affect other loads.

BRIEF DESCRIPTION OF THE DRAWINGS

FIG. 2 is a logic block diagram of the whole system having connected thereto loads to be inserted or removed by live wire work;

FIG. 3 is a current regulation circuit for a load to be inserted or removed by live wire work;

FIG. 4 is an output waveform in a current regulation circuit for a load to be inserted or removed by live wire work;

DESCRIPTION OF THE PREFERRED EMBODIMENT

An embodiment of the present invention will be described with reference to the accompanying drawings.

Figure 1:
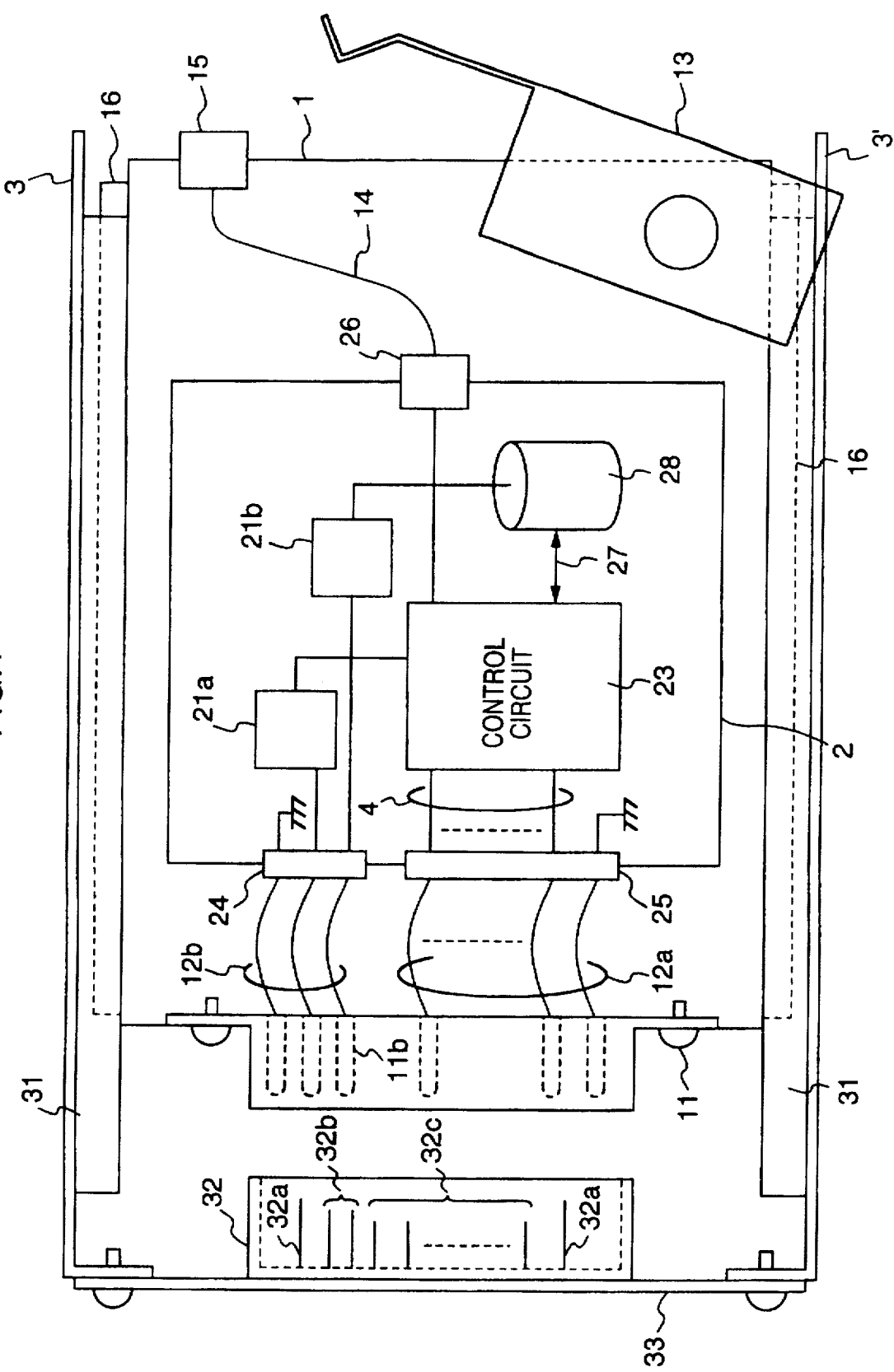
FIG. 1 is a general block diagram of an embodiment of the present invention.

FIG. 1 is a general block diagram of an embodiment of the present invention. In FIG. 1, reference numeral 1 denotes a unit to be inserted or removed by live wire work, and to enable a load to be inserted or removed by live wire work. Also shown are male/female plugs or connectors 11, two groups of cables 12a and 12b, a lever 13, an LED 15 for indicating permission to remove and so on that are mounted on the unit 1. Reference numeral 3 denotes a frame for mounting a plurality of units for live wire insertion or removal, and this frame 3 includes a plurality of male/female plugs or connectors 32, a printed circuit board 33 for mounting the connectors 32, and a guide rail 31 for smooth mounting or removal of the units by live wire work. The connectors 11 and 32 may be a pair of plug/receptacle or receptacle/plug. When the connector 11 has female pins, the connector 32 has male pins. Of course, the opposite pin configuration may be taken. The guide rails 31 are grooved, and along those grooves the protruding members of a unit slides. In addition to the connector 11, other parts such as a power source, not shown, and a control circuit, i.e., a processor, to control the loads 2 are mounted or connected on the printed circuit board 33 as the mother board. The connectors 32 includes a ground pin 32a, power source pins 32b and signal pins 32c, and the lengths become shorter for the ground pin 32a, the power supply pins 32b, and signal pins 32c in this order. For this reason, when the connectors 32 are connected, they get connected in this order of their lengths. The female pins of the connector 11 of the unit 1 for live wire insertion or removal are equal in length, and the electric power is connected through the connector 11, cables 12a and 12b and connectors 24 and 25 to a load 2. The current regulation circuits 21a and 21b each have an inrush current control path to control the inrush current so as to flow little by little. The current regulation circuits 21a and 21b each conduct a supply current to a current feeding path in normal operation. At the time of load insertion, they operate the inrush current control circuits to control the inrush current so as to flow little by little and after the flow of the inrush current is almost finished, they put the current feeding path into operation to supply the current to a plurality of loads 2. The current regulation circuit 21a supplies 5V, for example, to operate a control circuit 23 to control the operation of each load 2, while the current regulation circuit 21b supplies 12V, for example, to drive a motor when the load 2 has a magnetic disk or the like. The control circuit 23 has an ordinary function to control data transmission or a magnetic disk operation, for example, and also has a function to turn on the LED 15 to indicate that permission to remove a load has been issued. The lever 13 is used to move the unit 1 for live wire insertion sliding along the guide rails 31 attached to the insides of the mounting members 3, 3' by leverage.

FIG. 2 is a logic block diagram showing a system having a plurality of loads 2b to 2c connected by a common bus 4, and a processor 5 to control the loads 2a to 2c. The operation of the loads 2 is controlled by the control circuit 23. The frame 3 in FIG. 1 has the whole system of FIG. 2 mounted thereto or has the components other than the processor 5 mounted thereto and is connected to the processor 5 by a cable.

This embodiment will be described in greater detail in the following.

FIG. 3 is a detailed diagram of the current regulation circuit 21a or 21b. A portion on the right hand side of the circuit which includes transistors Tr1, Tr2, a capacitor C1, and a diode D1 is used to conduct an inrush current for a short period at the time of load insertion. A portion on the left hand side of the circuit which includes a MOSFET Tr4, a transistor Tr3, resistances R2, R3, R4 and R5, and a capacitor C2 serves as a current feeding path in a normal operation. FIG. 4 shows a waveform of output 212 of the current regulation circuit 21. When a unit for live wire insertion of FIG. 1 is inserted into a connector 32, a supply voltage $V_{IN}$ is applied to the input 211 of the current regulation circuits 21a, 21b. Consequently, a circuit portion, including the resistance R1 and the capacitor C1 functions as an integrating circuit, the voltage at the node 213 rises gradually in an integration waveform. When this voltage rises higher than the sum of the forward voltage of the diode D1 and the base-emitter voltage of the transistor Tr1, the diode D1 and the transistor Tr1 are turned on, so that a current flows through the collector of the transistor Tr1. As a result, the transistor Tr2, which forms a Darlington amplifier together with the above transistor Tr1, is turned on, too, and a current starts to flow from the input 211 to the output 212 of the current regulation circuit 21. As the voltage at the node 213 rises, the output 212 rises to approach the potential at the input 211. The potential at the node 214 for resistances R2 and R3 is decided by dividing the potential at the output 212 in proportion to the values of the resistances R2 and R3. If the potential at the node 214 reaches the forward voltage of the base-emitter voltage of Tr3 when the potential at the output 212 reaches V1 in FIG. 4, the transistor Tr3 turns on, and currents start to flow to the resistance R4 and the capacitor C2. C2 and R5 constitute a differentiating circuit, and when the potential at the node 215 slowly falls from the potential $V_{IN}$ at the input 211 and a potential develops between the source S and the gate G of a MOSFET Tr4 to such a level as to turn it on, the Tr4 conducts and the potential of the drain D rises to substantially the same level as the potential $V_{IN}$ of the input 211. Thus, Tr4 goes into the conducting state. By the time the MOSFET Tr4 turns on, the transistor Tr2 has almost conducted the inrush current to the load through the output 212. It ought to be noted that the current conducted from the transistor Tr2 to the output 212 is a current value obtained by multiplying the base current value of the transistor Tr1 by the current amplification factor of Tr1 and then by the current amplification factor of Tr2. By using a transistor with a current amplification factor which makes the above-mentioned current value equivalent to about the current value in a normal operation, the inrush current flowing through Tr2 can be suppressed. In another embodiment requiring a smaller inrush current during the short time period of insertion, the Darlington transistor pair may be replaced by one transistor.

In order to provide that the moment when the inrush current flows from the current regulation circuit 21a is different from the moment when the inrush current flows from the circuit 21b, the product of the resistance R1 and the capacitor C1 in FIG. 3 is varied to make the operation times of the circuits differ from each other. Or, the number of diodes D1 connected in series is changed so that the operation does not start before the potential at the node 213 rises much higher. Or, with the configuration of the current regulation circuits 21a and 21b remaining unchanged, by varying the time of power supply connection by varying the lengths of the voltage pins 11b of the connector 11 or pins 32b, the time when inrush currents of the respective power sources start flowing can be varied. In stead of the PNP transistor used for Tr2, it is possible to use an NPN transistor. Further, when the power source is a negative voltage, the source/drain connection of Tr4, the collector/emitter connection of Tr2/Tr1/Tr3, and the P-N connection of D1 will be inverted, naturally.

Figure 5:
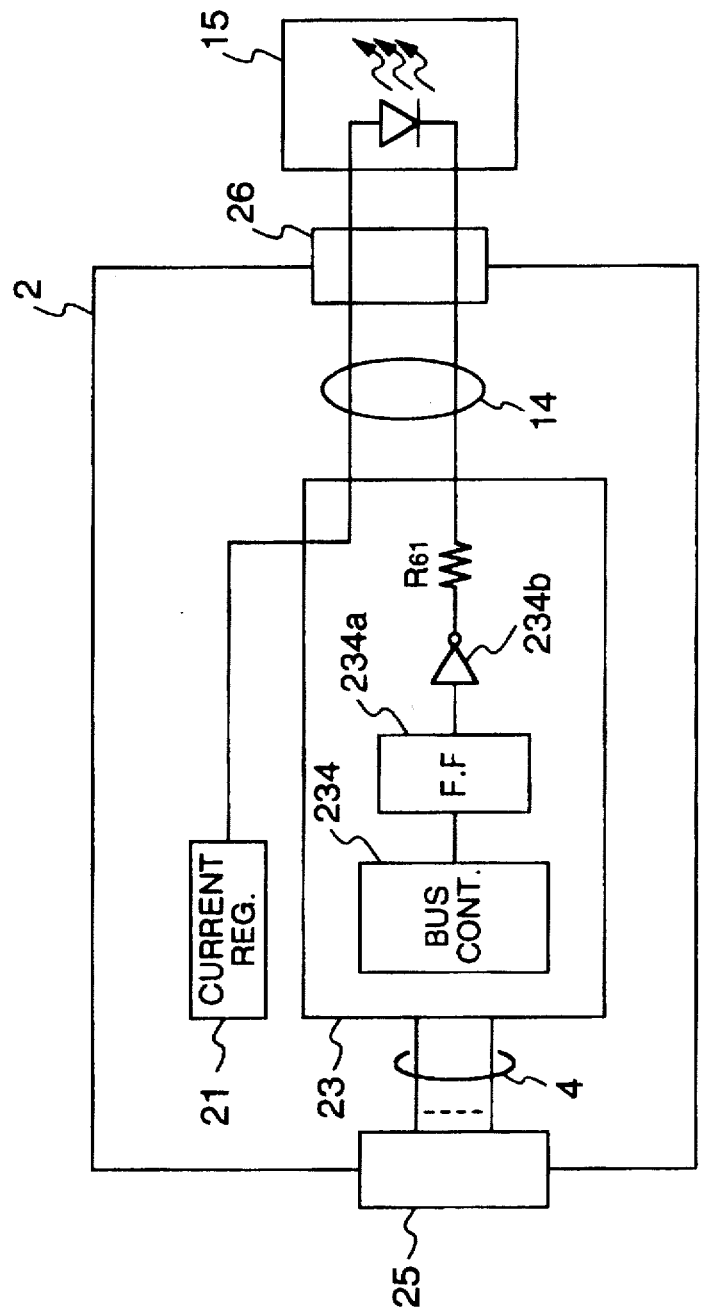
FIG. 5 is an explanatory diagram of an indication of permission to remove a load to be removed by live wire work.
Figure 6:
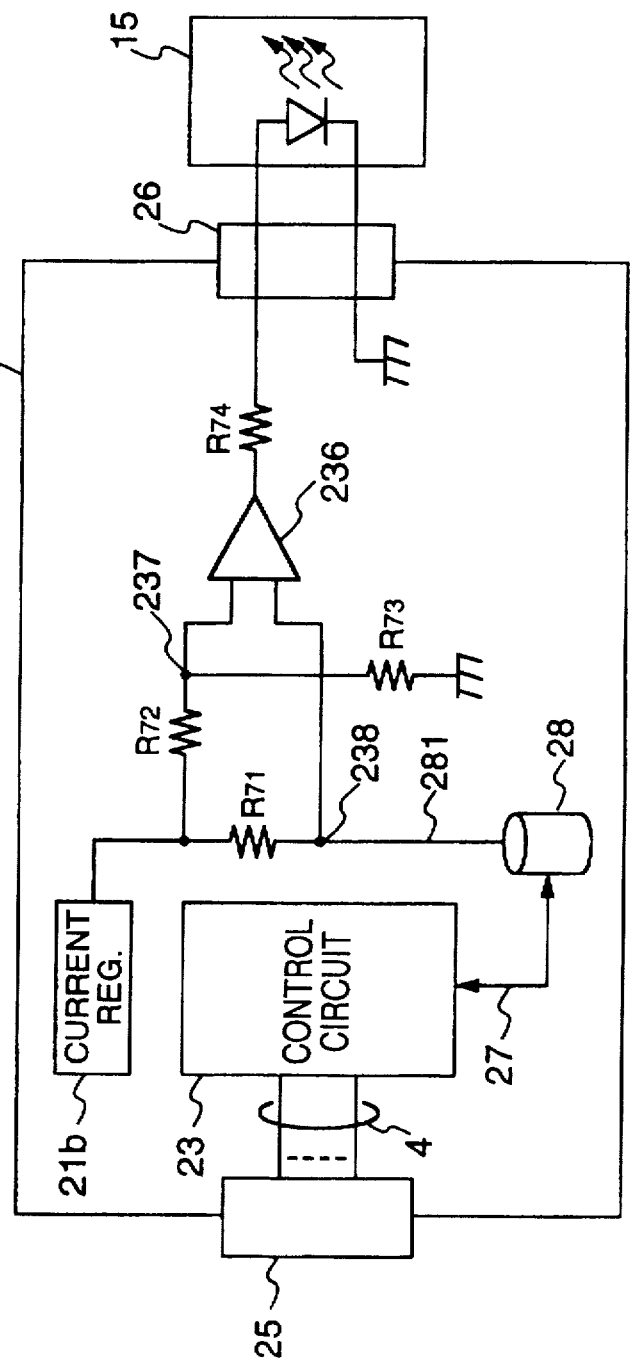
FIG. 6 is an explanatory diagram of another embodiment of an indication of permission to remove a load to be removed by live wire work.

Referring to FIGS. 5 and 6, description will be made of the indication of permission to remove a unit 1 for live wire insertion of FIG. 1. In FIG. 5, the control circuit 23 of a load 2 contains a bus control circuit 234 to control signals on the common bus of FIG. 2 and a removal permission flip-flop 234a, and when the bus control circuit 234 causes the flip-flop 234a to be set to the 1 state for allowing removal, the LED 15 to indicate removal permission is turned on through the inverter 234b and the connector 26 located between the resistance R61 and the current regulation circuit 21. The processor 5 in FIG. 2 functions to detect a fault in the circuit of a unit for live wire insertion. When the processor 5 detects a fault, it issues an operation stop command to the control circuit 234 in the control circuit 23 of FIG. 5 through the common bus 4. Triggered by this command, the bus control circuit 234 causes the removal permission flip-flop 234a to be set to the 1 state.

FIG. 6 shows a case where the control circuit 23 is not provided with the above-mentioned function to indicate permission to remove a unit. This is a block diagram showing an embodiment for indicating permission to remove a load 2 having a magnetic disk 28, for example. As described above, before a load is removed, when the processor 5 of FIG. 2 issues an operation stop command to the control circuit 23 of FIG. 6 through the common bus 4, the control circuit 23 stops the magnetic disk 28 through the control interface 27 for the magnetic disk 28, and the motor ceases rotating. In the magnetic disk 28, when the motor changes from the rotating state to the stationary state, the supply current to the motor decreases. When a resistance R71 is connected between the current regulation circuit 21b and the power supply terminal 281 of the magnetic disk 28, the voltage drop across R71 differs between when the motor is rotating and the motor is stationary. So, a circuit, including resistances R72 and R73, is connected to a node on the side of the resistance R71 which is closer to the current regulation circuit, and the node 237 and the node 238 located on the opposite sides across the resistance R71 are connected to two inputs of a potential comparator 236. The values of the resistances R72 and R73 are selected such that the node 237 has a potential decided by dividing the supply voltage in proportion to the values of resistances R72 and R73, but the potential at the node 238 is made lower than the potential at the node 237 by a current when the motor for the magnetic disk is rotating, and the potential at the node 238 becomes higher than the potential at the node 237 when the motor stops and the current decreases. By this arrangement, when the motor stops, the potential comparator 236 produces a high-level output as the condition is met, and supplies a current through the resistance 74 and the connector 26 to turn on the LED to indicate permission to remove.

Figure 7:
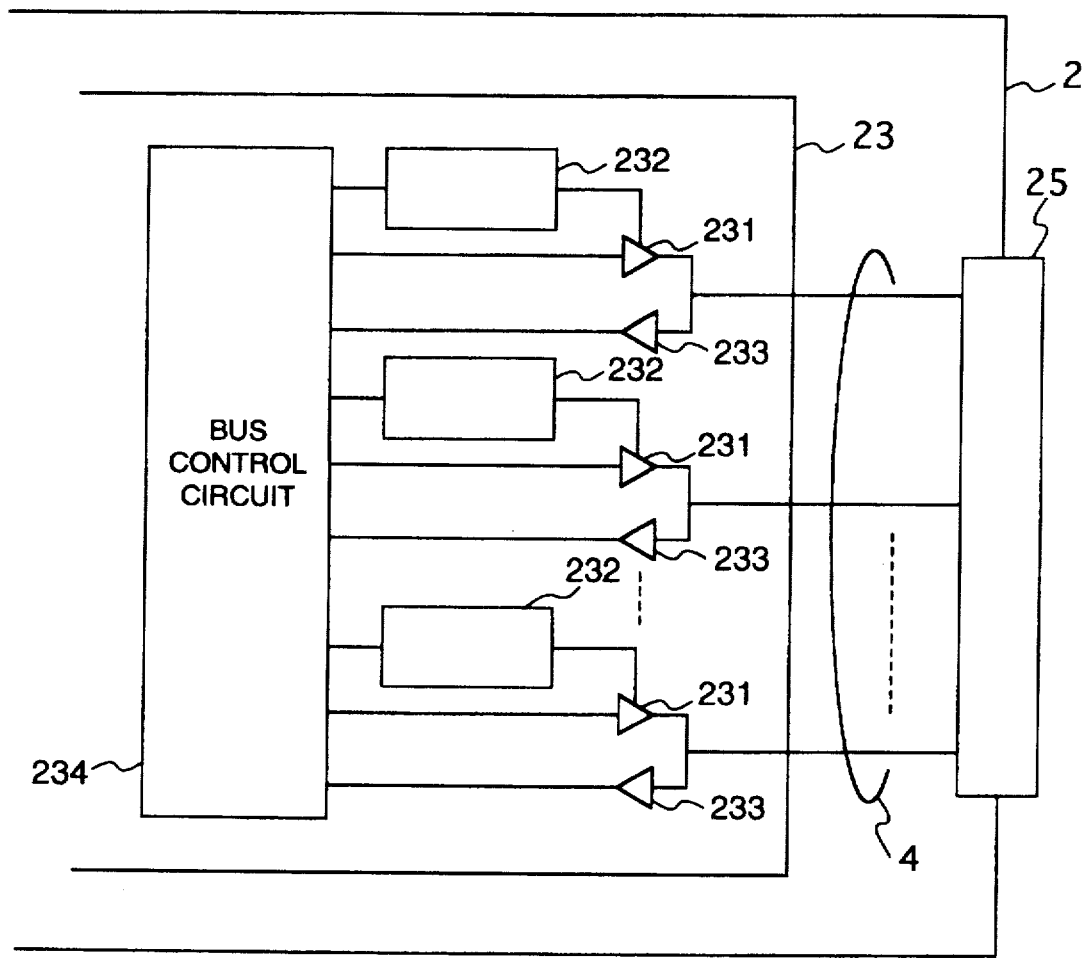
FIG. 7 is a diagram showing driver gates for a load to be inserted or removed by live wire work and the vicinity.

FIG. 7 is a diagram showing the driver/receiver gates and the vicinity. These driver/receiver gates are connected to the bus, used commonly with other loads, in the control circuit 23 of a load 2. The common bus 4 is connected to the control circuit 23 through the connector 25 of the load 2. The common bus 4 is connected to driver/receiver gates 231, 233 in the control circuit 23. Flip-flops 232 are connected to the enable terminals of the driver gates 231, 233. The bus control circuit 234 controls the flip-flops and the driver/receiver gates 231, 233. Upon receiving a fault signal from a unit for live insertion of FIG. 1, the processor 5 of FIG. 2 issues an operation stop command to a faulty unit through the common bus 4. In response to this command, the bus control circuit 234 in the control circuit 23 of a load 2 in FIG. 7 causes the flip-flop 232 to set to the logical 0 (in some cases, the logical 0 is set before an operation stop command is issued), and the driver gate 231 is set in the disabled (high impedance) state. The unit 1 can be removed by live wire work from a system safely and without giving current shocks to other loads.

In FIG. 5 or 6, when removing a unit, in response to an operation stop command to the control circuit 23 from the processor 5 as a trigger signal, the LED 15 for indicating permission to remove can be turned on. As shown in FIG. 7, when an operation stop command is issued, as described above, the bus control circuit 234in the control circuit 23 causes the flip-flop 232 for enable control of the driver gate to be set to the logical 0 (in some cases, the logical 0 is set before an operation stop command is issued), and at this time, the driver gate 231 is set in the disabled (high-impedance) state and permission to remove the load can be indicated by the LED 15.

Figure 8A:
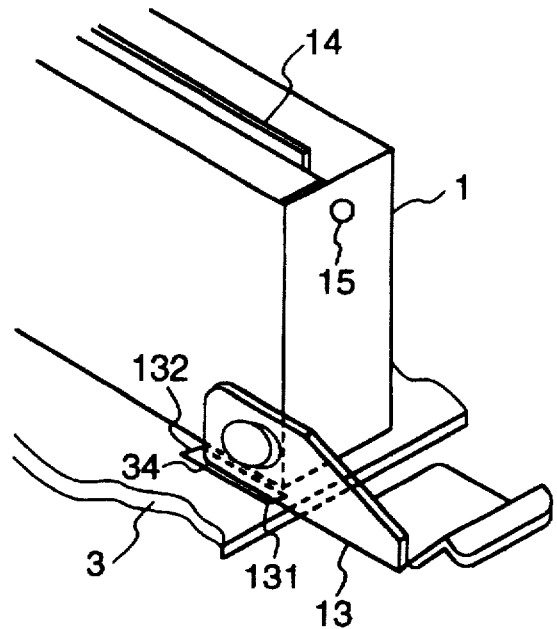
FIGS. 8A, 8B and 8C are explanatory diagrams of a slide mechanism for a load to be inserted or removed by live wire work.
Figure 8B:
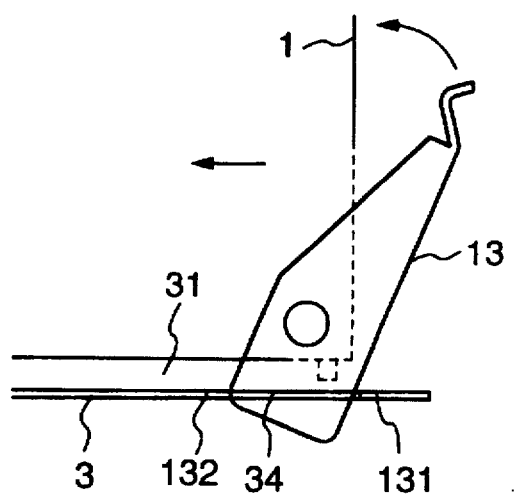
Figure 8C:
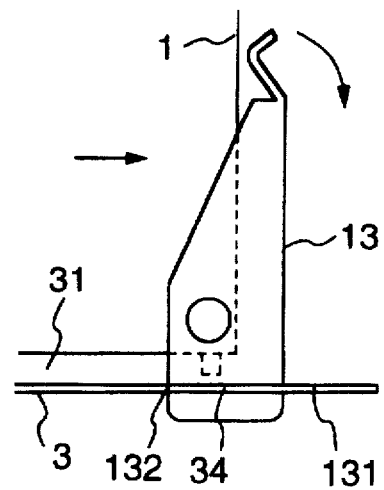

FIGS. 8A, 8B and 8C are diagrams for explaining the slide mechanism with a lever 13 used to insert or remove a unit 1 for live wire insertion shown in FIG. 1. FIG. 8A is a diagram showing the lever 13 and its vicinity, with the upper side omitted. When the unit 1 for live wire insertion is made to slide by the lever 13, the principle of leverage is applied using the groove 34. FIG. 8B shows the occasion of insertion, in which the lever 13 is fitted in the groove 34 of the frame 3, and when the lever 13 is pushed in the arrow direction, the unit 1 for live wire insertion slides on the guide rail 31 to left as the lever is rotated on the fulcrum 131 by leverage. FIG. 8C shows the occasion of removal, in which when the lever 13 is pulled in the arrow direction, the unit 1 for live wire insertion slides on the guide rail 31 to right as the lever is rotated on the fulcrum 132 (opposite the fulcrum 131). In either of the actions shown in FIGS. 8B and 8C, the moving speed of the unit 1 for live wire insertion can be controlled freely by the moving speed of the lever 13.

Figure 9A:
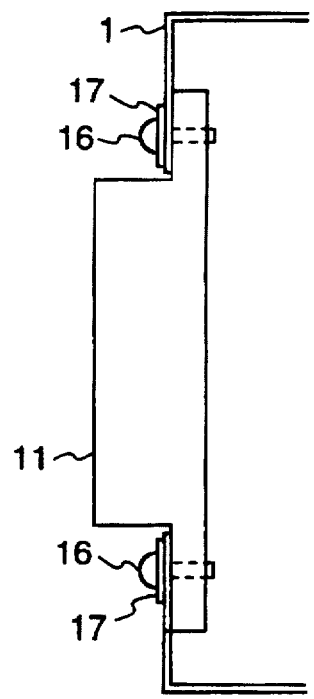
FIGS. 9A, 9B and 9C are explanatory diagrams of connectors for a load to be inserted or removed by live wire work.
Figure 9B:
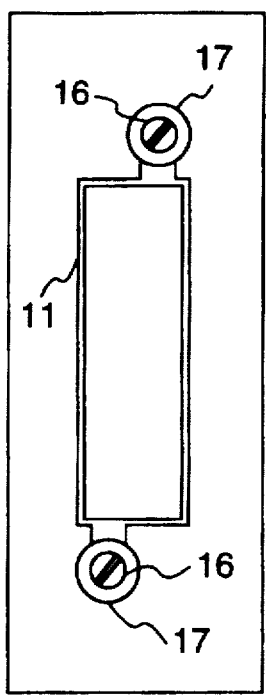
Figure 9C:
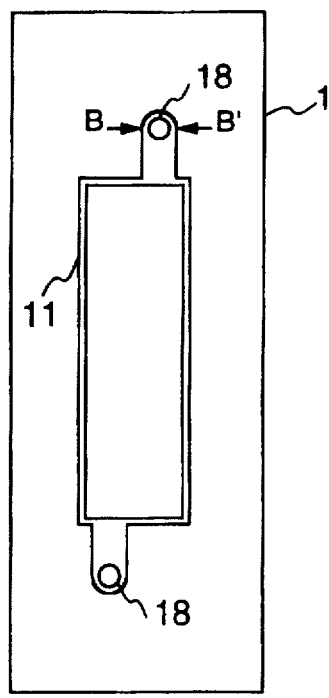
Figure 10:
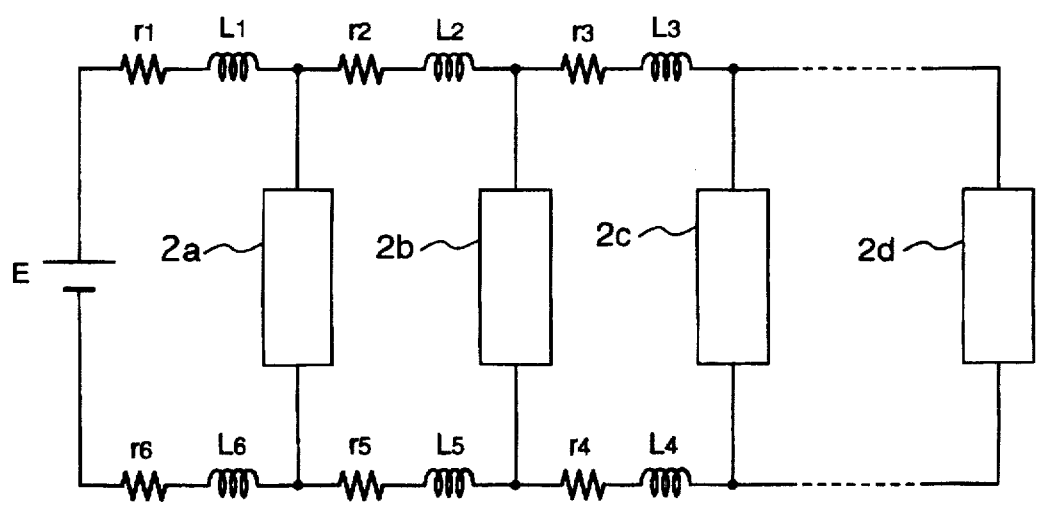
FIG. 10 is a diagram for explaining resistances in a current feeding paths for loads to be inserted or removed by live wire work.

FIGS. 9A, 9B and 9C are diagrams for showing the methods in which the connector 11 is mounted to the unit 1 for live wire insertion. FIG. 9A is a side view, in which the threaded screws 16 are connected to the connector 11, with interposition of flat washers 17 under the screw heads. The screws 16 are set loose so that the connector 11 can be moved back and forth a little. FIG. 9B is a front view, and FIG. 9C is a diagram with the screws 16 and the washers 17 removed. The dimension of the hole diameter B-B' of the metal plate is 2 to 4 mm greater than the diameter of the screws 16, the tapped holes 18 and the unit 1 for live wire insertion are set loose with a gap of about 0.5 mm to 2 mm provided so that the connector can be moved to the left and the right, and up and down. By the construction mentioned above, the connector 11 is mounted in a floating condition, and when the unit 1 is inserted into the connector 32 shown in FIG. 1 only by moving the connector 11 without the unit 1 being moved to left, right, up and down.

What is claimed is:

1. A circuit unit to be inserted or removed under live wire into or from a system having a plurality of circuit units and a power source for supplying power to said plurality of circuit units, said circuit unit comprising:

an input terminal having a pin for connection with said power source;

a first circuit connected to said pin of said input terminal for supplying power to said circuit unit with a delay of a predetermined gradual rise time from said power source via said input terminal when said circuit unit is inserted into said system to connect said input terminal to said power source; and a second circuit connected to said pin of said input terminal when said first circuit is connected to said pin of said input terminal for supplying power to said circuit unit during normal operation thereof after said predetermined gradual rise time from said power supply after said circuit unit is inserted into said system to connect said input terminal to said power source, wherein said first circuit stops supplying power at a time approximately when said second circuit starts supplying power.

2. A circuit unit according to claim 1, wherein said first circuit has a first transistor having a collector, an emitter and a base and said second circuit has a second transistor having a drain, a source and a gate, and wherein said emitter and said source are connected to a common input which is connected to said power source when said circuit unit is inserted into said system and said collector and said drain are connected to a common output.

3. A circuit unit according to claim 2, further comprising:

a circuit, connected to the base of said first transistor of said first circuit, for integrating a voltage at said input when said circuit unit is connected to said power source, in order to trigger a stop of supply of power from said power source; and a circuit, connected to the gate of said second transistor of said second circuit, for differentiating a voltage at said input when said circuit unit is connected to said power source.

4. A circuit unit according to claim 3, further comprising:

a conduction initiating circuit connected to said gate of said second transistor to cause said second transistor to conduct when the voltage at said output supplied by an operation of said first transistor reaches a specified voltage.

5. A circuit unit according to claim 4, wherein said first transistor is a bipolar transistor having another transistor connected in a Darlington connection and said second transistor is a unipolar transistor.

6. A circuit unit according to claim 1, further comprising:

a third circuit for supplying power to said circuit unit from another power source of said system when said circuit unit is inserted into said system; and a fourth circuit for supplying to said circuit unit from said other power source in a normal operation of said circuit unit after said circuit unit is inserted into said system, wherein said third circuit nearly stops supplying power about the moment said fourth circuit starts supplying power at a time different from a time when said first circuit nearly stops supplying power about the moment said second circuit starts supplying power.

7. A circuit unit according to claim 1, further comprising a removal permission indicator which turns on by a voltage supplied from said power source under a condition that permission to remove said circuit unit has been issued.

8. A circuit unit according to claim 7, further comprising a transmission control circuit for controlling transmission to another unit through a driver circuit, wherein said transmission control circuit has a flip-flop for setting said driver circuit in an output disabled state.

9. A circuit unit according to claim 8, further comprising a lever, mounted rotatably at one end of said circuit unit, for multiplying a force for removing said unit by using as a point of force application a certain point in said system under the condition that permission to remove said circuit unit has been issued.

10. A circuit unit according to claim 8, further comprising:

a metal sheet for mounting said circuit unit; and a connector connected at a mounting portion of said metal sheet to said metal sheet for electrical connection with said system, wherein said connector is structured so as to be freely movable at said mounting portion for several millimeters on the surface of said metal sheet when said system and said connector of said unit are connected mechanically and electrically.

11. A circuit unit according to claim 10, wherein said mounting portion has at positions matching mounting holes of said connector 0.5 to 2.0 millimeters greater in diameter than screws for mounting said connector to said metal sheet of said unit and said connector is fastened to said metal sheet by said screws significantly loosely.

12. A circuit unit to be inserted or removed under live wire into or from a system having a plurality of circuit units and a power source for supplying power to said plurality of circuit units, said circuit unit comprising:

a first circuit connected to said power source when said circuit unit is inserted into said system for supplying power to said circuit unit from said power source when said circuit unit is inserted into said system; and a second circuit simultaneously connected to said power source when said circuit unit is inserted into said system for supplying power to said circuit unit during normal operation thereof after said circuit unit is inserted into said system, wherein said second circuit starts to supply power when a voltage supplied by said first circuit gradually reaches a predetermined voltage in comparison with said supply voltage and said first circuit substantially stops supplying power at approximately a time when said second circuit starts supplying power.

13. A circuit unit according to claim 12, wherein said first circuit has a first transistor having a collector, an emitter and a base and said second circuit has a second transistor having a drain, a source and a gate, and wherein said emitter and said source are connected to a common input which is connected to said power source and said collector and said drain are connected to a common output.

14. A circuit unit according to claim 13, further comprising:

a circuit, connected to the base of said first transistor of said first circuit, for integrating a voltage at said input when said circuit unit is connected to said power source, in order to trigger a stop of supply of power from said power source.

15. A circuit unit according to claim 14, further comprising:

a circuit, connected to the gate of said second transistor of said second circuit, for differentiating a voltage at said input when said circuit unit is connected to said power source.

16. A circuit unit according to claim 13, further comprising:

a conduction initiating circuit connected to said gate of said second transistor to cause said second transistor to conduct when the voltage at said output supplied causing said conduction initiating circuit conducting by an operation of said first transistor reaches a specified voltage.

17. A circuit unit according to claim 16, wherein said first transistor is a bipolar transistor having another transistor connected in a Darlington connection thereto and said second transistor is a unipolar transistor.

18. A circuit unit according to claim 12, further comprising:

a third circuit connected to another power source of said system when said circuit unit is inserted into said system for supplying power to said circuit unit from said another power source when said circuit unit is inserted into said system; and a fourth circuit connected to said another power source when said circuit unit is inserted into said system for supplying power to said circuit unit during normal operation thereof after said circuit unit is inserted into said system, wherein said third circuit nearly stops supplying power about the moment said fourth circuit starts supplying power at a time different from a time when said first circuit nearly stops supplying power about the moment said second circuit starts supplying power.

19. A circuit unit according to claim 1, further comprising a removal permission indicator which turns on by a voltage supplied from said power source under a condition that permission to remove said circuit unit has been issued.

20. A circuit unit according to claim 7, further comprising a transmission control circuit for controlling transmission to another unit through a driver circuit, wherein said transmission control circuit has a flip-flop for setting said driver circuit in an output disabled state.

21. A circuit unit according to claim 19, further comprising a hard disc storage and a motor detection circuit for detecting a rotation stop state of said hard disc storage.

22. A circuit unit according to claim 21, further comprising a lever, mounted rotatably at one end of said circuit unit, for multiplying a force for removing said unit by using as a point of force application a certain point in said system under the condition that permission to remove said circuit unit has been issued.

23. A circuit unit according to claim 22, further comprising:

a metal sheet for mounting said circuit unit; and a connector connected at a mounting portion of said metal sheet to said metal sheet for electrical connection with said system, wherein said connector is structured so as to be freely movable at said mounting portion for several millimeters on the surface of said metal sheet when said system and said connector of said unit are connected mechanically and electrically.

24. A circuit unit according to claim 23, wherein said mounting portion has at positions matching mounting holes of said connector 0.5 to 2.0 millimeters greater in diameter than screws for mounting said connector to said metal sheet of said unit and said connector is fastened to said metal sheet by said screws significantly loosely.

25. A circuit unit to be inserted or removed under live wire into or from a system having a plurality of circuit units and a power source for supplying power to said plurality of circuit units, said circuit unit comprising:

an input terminal having a pin for connection with said power source;

a first circuit connected to said pin of said input terminal for supplying power to said circuit unit with a gradually rising voltage from said power source via said input terminal when said circuit unit is inserted into said system to connect said input terminal to said power source; and a second circuit connected to said pin of said input terminal when said first circuit is connected to said pin of said input terminal for supplying power to said circuit unit during normal operation thereof when said gradually rising voltage reaches a predetermined level after said circuit unit is inserted into said system to connect said input terminal to said power source, wherein said first circuit stops supplying power at a time approximately when said second circuit starts supplying power.

26. A circuit unit according to claim 25, further comprising:
    a circuit, connected to a base of a transistor of said first circuit, for integrating a voltage at said input when said circuit unit is connected to said power source, in order to trigger a stop of supply of power from said power source; and
    a circuit, connected to a gate of a transistor of said second circuit, for differentiating a voltage at said input when said circuit unit is connected to said power source.

27. A circuit unit to be inserted or removed under live wire into or from a system having a plurality of circuit units and a power source for supplying power to said plurality of circuit units, said circuit unit comprising:
    an input terminal having a pin for connection with said power source;
    a first circuit connected via said pin to said input terminal for supplying power to said circuit unit from said power source via said input terminal and an integration circuit for said power from said input terminal when said circuit unit is inserted into said system to connect said input terminal to said power source; and
    a second circuit connected via said pin to said input terminal when said first circuit is connected to said input terminal for supplying power to said circuit unit during normal operation thereof after said circuit unit is inserted into said system to connect said input terminal to said power source,
    wherein said first circuit stops supplying power at a time approximately when said second circuit starts supplying power.

28. A circuit unit according to claim 27, further comprising:
    a circuit, connected to a base of a transistor of said first circuit, for integrating a voltage at said input when said circuit unit is connected to said power source, in order to trigger a stop of supply of power from said power source; and
    a circuit, connected to a gate of a transistor of said second circuit, for differentiating a voltage at said input when said circuit unit is connected to said power source.

29. A circuit unit according to claim 1, further comprising:
    a circuit, connected to a base of a transistor of said first circuit, for integrating a voltage at said input when said circuit unit is connected to said power source, in order to trigger a stop of supply of power from said power source; and
    a circuit, connected to a gate of a transistor of said second circuit, for differentiating a voltage at said input when said circuit unit is connected to said power source.

30. In a system having a plurality of loads operating concurrently, wherein a circuit board is inserted into the system during continuous operation of the system, the circuit board having a current regulation circuit comprising:
    an inrush current circuit which conducts an inrush current until a predetermined period of time after the circuit board is inserted into the system;
    a normal operation circuit which provides a current feeding path for the circuit board and conducts a current after the predetermined period of time has elapsed, and
    an input terminal having a pin said pin being commonly connected to a first end of the inrush current circuit and the normal operation circuit, wherein a supply voltage is applied to the input upon insertion of the circuit board.

31. The current regulation circuit according to claim 30, wherein the inrush current circuit includes a resistor, a capacitor and a first diode commonly connected at a node, wherein the resistor and the capacitor act as an integrating circuit.

32. The current regulating circuit according to claim 31, wherein the inrush current circuit further comprises a Darlington amplifier and wherein the first diode is connected between the Darlington amplifier and the node.

33. The current regulating circuit according to claim 31, wherein the inrush current circuit includes only a single transistor and wherein the first diode is connected between the single transistor and the node.

34. The current regulating circuit according to claim 31, wherein the relationship between an operation time of the inrush current circuit and an operation time of the normal operation circuit is controlled by adjusting the values of the resistor and the capacitor or by connecting additional diodes in series with the first diode.

35. The current regulating circuit according to claim 30, further comprising an output commonly connected to a second end of the inrush current circuit and the normal operation circuit,
    wherein, after insertion of the circuit board, current is conducted from the input to the output via the inrush current circuit until a certain point in time after which current is conducted from the input to the output via the normal operation circuit.

* * * * *